United States Patent Office 3,017,246
Patented Jan. 16, 1962

3,017,246
PROCESS FOR THE JOINT MANUFACTURE OF HYDROFLUORIC ACID AND PORTLAND CEMENT CLINKER
Jonas Kamlet, % Kamlet Laboratories, 300 Park Ave. S., New York 10, N.Y.; Edna Yadven Kamlet, executrix of said Jonas Kamlet, deceased
No Drawing. Filed Apr. 21, 1960, Ser. No. 23,633
13 Claims. (Cl. 23—153)

This invention relates to a process for the joint manufacture of hydrofluoric acid and Portland cement clinker. More particularly, this invention relates to a process whereby hydrofluoric acid may be manufactured from calcium fluoride-containing raw materials (such as fluorspar), without the use of sulfuric acid, and with the simultaneous recovery of Portland cement clinker of good quality as a co-product.

Except for such quantities as are obtained by the phosphate industry as a by-product in the manufacture of wet-process phosphoric acid, in the defluorination of phosphate rock or from the den gases in the manufacture of superphosphate fertilizers, hydrofluoric acid is now obtained industrially almost entirely by the reaction of fluorspar with sulfuric acid. Since fluorspar usually occurs in nature in a gangue containing quantities of calcite, limestone, quartz, sphalerite and other minerals, an expensive beneficiation process must be resorted to in order to obtain a grade of fluorspar suitable for hydrofluoric acid production. Such acid-grade fluorspars contain 97.5%–98.0% $CaF_2$, a maximum of 1.0% $SiO_2$ and the remainder $CaCO_3$, and are relatively expensive (e.g. at the present time acid-grade fluorspar is as much as twice as expensive as poorer grades of fluorspar containing an equivalent amount of actual $CaF_2$). "Effective" $CaF_2$ content of a fluorspar is calculated as the total of the actual $CaF_2$ content less 2.5 times the silica content. Thus, the "effective" $CaF_2$ content of a fluorspar (on the basis of which it is sold) may be considerably lower than its actual $CaF_2$ content, if the silica content is relatively high. Thus, a fluorspar containing (e.g.) 84.5% $CaF_2$, 12.7% $SiO_2$ and 2.8% $CaCO_3$ would have an "effective" $CaF_2$ content of 52.8% and would be too poor to qualify as metallurgical grade fluorspar.

In the process of my invention, the silica and the $CaCO_3$ content of the fluorspar actually contribute to the formation of the hydrofluoric acid and the Portland cement clinker co-product and represent no disability or disadvantage, but rather are actual reagents in the process. It is a further purpose of my invention to provide a process which will allow the very poorest grades of fluorspar to be used economically in the manufacture of hydrofluoric acid.

In the processes of the present art (e.g. Lawrence, U.S. Patent 2,047,210 (1936), from 3.2 to 3.6 tons of 66° Bé. sulfuric acid are consumed in the manufacture of a ton of hydrofluoric acid from acid-grade fluorspar. This is an appreciable item of raw materials cost. It is the further purpose of my invention to provide a process for the manufacture of hydrofluoric acid from calcium fluoride-containing materials which requires no sulfuric acid whatever and which completely obviates its use.

Mikhailov and Vedernikova, in a paper in a Russian journal (Izvest. Sibir. Otdel. Akad. Nauk S.S.S.R. 1959, #3, 49–61) (Chemical Abstracts 53, 21319a) have shown that the reaction of calcium fluoride with silica in a stream of steam at temperatures between 1050° C. and 1250° C., effects the release of 85% of the fluorine in the $CaF_2$ in relatively short reaction times.

From my preliminary experiments, I have confirmed this finding and have also found that alumina and iron oxide will also catalyze the liberation of HF from $CaF_2$ by reaction with steam at advanced temperatures.

The basis of my invention is the finding that hydrofluoric acid and Portland cement clinker may be manufactured by reacting a calcium fluoride-containing material with a source of alumina, a source of silica and a source of iron oxides, in proportion to produce Portland cement clinker, in the presence of steam, at temperatures between 1000° C. and 1450° C.

The argillaceous raw materials for the process of this invention (i.e. the sources of alumina and silica, which almost invariably contain minor amounts of iron oxides) are chosen from the group consisting of clays, shales, kaolins, bauxites, slates, blast-furnace slags, open-hearth slags, metallurgical slags, ashes, cement rocks, marls, sands and sandstones. These are almost invariably cheap and readily available raw materials in which the alumina, silica and iron oxides are present in free or associated forms, and are highly reactive with the calcium fluoride and the water (i.e. the steam) at the advanced temperatures of the reaction.

The calcium fluoride-containing material for the process of this invention is fluorspar (also known as fluorite, fluor and (in Great Britain) as Derbyshire spar).

I have found that when these materials, in proper proportions to make Portland cement clinker are reacted at temperatures between 1000° C. and 1450° C., and preferably to a terminal temperature between 1300° C. and 1450° C. (to incipient, partial or total fusion), while passing water vapor (i.e. steam) over the reaction mixture, the following reaction occurs:

$$CaF_2 + H_2O + xSiO_2 + yAl_2O_3 + zFe_2O_3$$
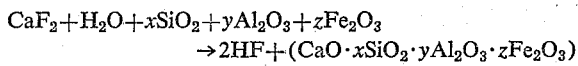
$$\rightarrow 2HF + (CaO \cdot xSiO_2 \cdot yAl_2O_3 \cdot zFe_2O_3)$$

where $x$, $y$ and $z$ can vary over certain ranges and the final complexes represent the various recognized components of Portland cement clinker, i.e.

Tricalcium silicate, $3CaO.SiO_2$
Dicalcium silicate, $2CaO.SiO_2$
Tricalcium aluminate, $3CaO.Al_2O_3$
Tetracalcium aluminoferrite, $4CaO.Al_2O_3.Fe_2O_3$ and possibly other binary, ternary and quaternary compounds and series of solid solutions.

If the terminal reaction temperature is between 1300° C. and 1450° C., I have found that 95.0% to 99.5% of the fluorine in the $CaF_2$ is evolved with the steam as HF (and may be recovered from the steam by condensing the effluent kiln gases), and the discharged sinter is a good Portland cement clinker.

The residence period within the kiln may vary over wide limits of time, but is approximately the same as is the case in the well known present day Portland cement processes.

The kiln feed is proportioned so as to contain the equivalent of 40.8 to 47.2 parts by weight of calcium (i.e. as the total of the calcium present in the calcium fluoride-containing material, i.e. the $CaF_2$ and the $CaCO_3$) and any calcium which may be present in the argillaceous material, from 3.0 to 12.0 parts by weight of alumina, from 17.0 to 26.0 parts by weight of silica (including any silica which may be present in the fluorspar) and from 2.0 to 6.0 parts by weight of iron oxides, the latter three components being supplied largely or in part by the argillaceous material.

The clinker thus obtained may be cooled, stored and ground with gypsum (as required) as a retarder by the well known method now used for the finish grinding of clinker to Portland cement.

The clinker obtained from the hot end of the kiln has the following composition:

| | Percent |
|---|---|
| Calcium oxide | 57.0 to 66.0 |
| Aluminum oxide | 3.0 to 12.0 |
| Silicon dioxide | 17.0 to 26.0 |
| Iron oxide (as $Fe_2O_3$) | 2.0 to 6.0 | these components being present in the clinker in the forms of tricalcium silicate ($3CaO \cdot SiO_2$), tricalcium aluminate ($3CaO \cdot Al_2O_3$), dicalcium silicate ($2CaO \cdot SiO_2$), and complex calcium aluminoferrites and calcium aluminosilicates. All five types of Portland cement recognized in the United States may be made by the process of the present invention, i.e. I, general construction; II, moderate heat of hardening; III, high early strength; IV, low heat and V, sulfate-resisting.

Theoretically, one mole of water is required for each mole of $CaF_2$ present in said kiln feed, i.e., about 0.23 part by weight of water vapor for each part by weight of $CaF_2$. In practice, I prefer to use an excess of water from 0.25 part up to 10 parts by weight for each part of $CaF_2$ in the kiln feed, and preferably from 2.0 to 3.0 parts by weight of water for each part of $CaF_2$ in the kiln feed. The amount of steam used in the process of this invention is by no means critical and may vary over wide ranges (e.g. from 0.25 to 10.0 parts by weight for each part by weight of $CaF_2$ in the kiln feed). It is desirable not to use more steam than is found necessary to avoid an excessive dilution of the HF in the condensed steam effluent from the kiln. The HF in the said kiln gas effluent may be used while still in the vapor state, or may be condensed as aqueous hydrofluric acid, or may be processed and employed in any manner or by any method known in the art.

As in the old and well known cement processes of the art, the kiln feed may be processed to Portlant cement clinker by either the "dry" process or the "wet" process.

In the "dry" process, the above admixture of components is proportioned, dried, ground to a uniform fineness (about 20 mesh) and blended. The mixed materials then pass through finishing mills, in which the fineness is brought to about 200 mesh. The raw materials are then passed to the cement kiln and burned in the usual manner to a Portland cement clinker.

In the "wet" process, the above admixture of components is proportioned, ground to a uniform fineness (at least 85% passing through a 200 mesh screen) and made into a slurry with water, the water content of the slurry being between 35% and 70%. This slurry is fed to the cement kiln and burned to a Portland cement clinker, the water content of the slurry being volatilized and carried over as steam with the kiln gases.

No attempt will be made in the present instance to describe in any detail the processes involved in drying, proportioning, grinding and preparing the raw materials required for the kiln feed, the burning of the mix to clinker or the subsequent treatment of the clinker in the manufacture of the various types of Portland cement. All of this is well known to persons skilled in the art.

If the "wet" process is employed in the process of this invention, the water employed to make the kiln feed slurry may provide all or part of the steam required for the reaction. However, since this water is usually volatilized in the "cold" end of the kiln, where the kiln feed is introduced, it is desirable to recycle at least part of this volatilized water vapor through the kiln, introducing it at the "hot" end of the kiln, together with the vaporized fuel, so that the steam has the opportunity to react with the kiln feed components. This recycling of the steam effects a considerable fuel economy, so that the overall fuel consumption by this process is almost indentical with that of present-day "wet" processes for cement manufacture.

The fuel employed in the burning of the kiln fuel mix in this process may be any of the conventional solid, liquid or gaseous natural or synthetic fuels, e.g. powered anthracite or bituminous coal, coke, petroleum coke (by-product of the petroleum refining industry), charcoal, petroleum, petroleum fractions (such as gasoline, kerosene, fuel oils, heavy oils), natural gas, producer gas, coke oven gas, etc. The preferred fuels are natural gas, petroleum fuel oils and powered coal.

The Portland cement clinker obtained by this process may contain minor amounts of undecomposed calcium fluoride. This is not only not a disadvantage but it actually improves the performance of the cement, improves the properties of the clinker, lowers the sintering time required, reduces the undesirable free CaO content of the cement, serves as a flux for the kiln feed and improves the fluidity of the kiln feed; as much as 5% of $CaF_2$ can be tolerated in the clinker (Becker, Zement, 16, 305–8 (1927)); Flint, Rock Product, 42, #10, 40–2,52 (1939); Endell and Hendrickx, Zement, 31, 416–19 (1942); Zhuravlev, Lesokhen and Tempelman, Zhur. Priklad. Khem., 21, 887–902 (1948); von Gronow, Zement-Kalk-Gips, 1, 85–7 (1948); Nagai and Harada, Journ. Ceramic Assoc. Japan, 59, 533–7 (1951); Konovalov-Tzement, 18, #3, 14–17 (1952); Toropov and Luginina, Silikat-techn., 4, 470–1 (1953); Azeletskaya, Tzement, 19, #3, 13–15 (1953).

The following examples are given to define and to illustrate this invention but in no way to limit it to reagent proportions or conditions described therein. Obvious improvements and modifications will occur to any persons skilled in the art. All proportions given are in parts by weight.

*Example I.—Dry process*

A fluorspar was used which assayed 84.5% $CaF_2$, 12.7% $SiO_2$ and 2.8% $CaCO_3$. A clay was used which assayed 38.0% $Al_2O_3$, 48.3% $SiO_2$ and 13.2% $Fe_2O_3$ (dry weight).

The kiln feed was made by mixing 100.0 parts of the fluorspar and 25.0 parts of the clay (dry weight basis), and which therefore contained: 44.5 parts of calcium (as $CaF_2$ and $CaCO_3$), 24.8 parts of silica, 9.5 parts of alumina and 4.3 parts of $Fe_2O_3$. This kiln feed was prepared for calcining (as above described) by ultimate grinding through finishing mills to about 200 mesh, and was then fed to the cement kiln, where the terminal temperature (at the "hot" end of the kiln) is between 1350° C. and 1450° C., for a total residence time of about two hours in the kiln. During this period, a total of about 200 parts of water (in the form of steam) is passed over the kiln feed in the rotating kiln. The effluent gases are cooled (e.g. through a heat exchange unit) and condensed to obtain an aqueous HF solution. The steam used amounts to about 2.37 parts by weight for each part of $CaF_2$ in the kiln feed.

There was thus obtained 20.6 parts of hydrofluoric acid (as an approximately 11% aqueous solution) and 95.0 parts of a Portland cement clinker assaying 62.1% CaO, 9.5% $Al_2O_3$, 23.1% $SiO_2$, 4.1% $Fe_2O_3$ and 0.916% of fluorine. This clinker, ground to Portland cement fineness, and properly formulated, gave a neat cement surpassing all specifications.

*Example II.—Wet process*

A fluorspar was used which assayed 84.5% $CaF_2$, 12.7% $SiO_2$ and 2.8% $CaCO_3$. As a source for the silica alumina and iron oxide, we used a blast furnace slag assaying 40.2% CaO, 34.2% $SiO_2$, 12.1% $Al_2O_3$ and 4.6% of FeO.

The cement kiln feed was made by mixing 50.0 parts of the fluorspar with 50.0 parts of the blast furnace slag, grinding (as above described) in finishing mills to ultimate fineness of 85% through a 200 mesh screen, and made into a slurry with 200.0 parts of water (i.e. a slurry with 33.3% solids content). On the dry weight basis, this cement kiln feed contains: combined calcium—

46.6 parts, silica—23.5 parts, alumina—6.0 parts, and iron oxide—2.3 parts.

This slurry is then fed to a rotary kiln, with a terminal temperature at the hot end of the kiln of between 1350° C. to 1450° C., for a total residence period within the kiln of about 2.5 hours. Half of the water vapor volatilized on feeding the slurry at the "cold" end of the kiln is recycled through the "hot" end of the kiln (i.e. a total of 100 parts of water vapor for the 42.25 parts of the $CaF_2$ in the kiln feed) over the 2.5 hour period of the calcination.

There was thus obtained 98.0 parts of a Portland cement clinker assaying 65.6% CaO, 23.5% $SiO_2$, 6.1% $Al_2O_3$ and 2.4% $Fe_2O_3$ (the FeO being oxidized to $Fe_2O_3$ in the kiln) and 1.210% of fluorine. On cooling and condensing the kiln gases, there was recovered 10.2 parts of HF as an 11.8% aqueous solution.

In the process of this invention, a very minor part of the silica in the kiln feed mix is volatilized with the HF, in the form of $SiF_4$, and is recovered in the HF condensate as fluosilicic acid—$H_2SiF_6$. However, at the advanced temperatures in the kiln, the $SiF_4$ formed tends to hydrolyze almost completely in the kiln and the $H_2SiF_6$ content of the HF obtained is very low. The ratio of fluorine to combined $SiO_2$ (as $H_2SiF_6$) in the HF obtained is usually in excess of 100 to 1. This represents a purer hydrofluoric acid than can be obtained by almost any commercial process of the prior art.

The clinkers, ground to Portland cement fineness and properly formulated, gave a neat cement surpassing all specifications.

Having described my invention, what I claim and desire to protect by Letters Patent is:

1. A process for the joint manufacture of hydrofluoric acid and Portland cement clinker which comprises the steps of:
    (a) feeding a mixture of a calcium fluoride-containing material, a source of alumina, a source of silica and a source of iron oxide to a rotary kiln, said mixture containing from 40.8 to 47.2 parts by weight of calcium in combined form as calcium fluoride and calcium carbonate, from 3.0 to 12.0 parts by weight of alumina, from 17.0 to 26.0 parts by weight of silica and from 2.0 to 6.0 parts by weight of iron oxide;
    (b) calcining said kiln feed mixture at a maximum temperature of between 1000° C. and 1450° C. while passing steam over said mixture;
    (c) recovering the effluent kiln gases containing hydrofluoric acid; and
    (d) recovering a Portland cement clinker from the substantially defluorinated reaction products of the calcination.

2. The process of claim 1 in which the source of the alumina, the source of the silica and the source of the iron oxide is chosen from the group consisting of clays, shales, kaolins, bauxites, slates, blast-furnace slags, open-hearth slags, metallurgical slags, ashes, cement rocks, marls, sands and sandstones.

3. The process of claim 1 in which the source of the calcium fluoride-containing material is chosen from the group consisting of fluorspar, fluorite, fluor and Derbyshire spar.

4. The process of claim 1 in which the source of the calcium fluoride-containing material is fluorspar.

5. The process of claim 1 in which the source of the calcium fluoride-containing material is fluorspar high in silica content.

6. The process of claim 1 in which the maximum temperature of the calcination of step (b) is between 1300° C. and 1450° C.

7. The process of claim 1 in which steam corresponding to from 0.25 to 10.0 parts by weight for each part by weight of calcium fluoride in the kiln feed mix is passed over the said kiln feed during the calcination.

8. The process of claim 1 in which steam corresponding to from 2.0 to 3.0 parts by weight for each part by weight of calcium fluoride in the kiln feed mix is passed over the said kiln feed during the calcination.

9. The process of claim 1 in which the kiln feed mixture is fed to the kiln in a substantially dry comminuted state.

10. The process of claim 1 in which the kiln feed mixture is fed to the kiln as an aqueous slurry.

11. The process of claim 1 in which the kiln feed mixture is fed to the kiln as an aqueous slurry, and the water in said slurry generates the steam required for reaction with the said kiln feed.

12. The process of claim 1 in which the kiln feed mixture is fed to the kiln as an aqueous slurry and at least part of the steam generated at the colder end of the kiln by the volatilization of the water in said slurry is recycled through the hotter end of the kiln and is passed over the said kiln feed during the calcination.

13. The process of claim 1 for the manufacture of a Portland cement clinker assaying from 57.0% to 66.0% CaO, from 3.0% to 12.0% $Al_2O_3$, from 17.0% to 26.0% $SiO_2$ and from 2.0% to 6.0% $Fe_2O_3$ in content.

References Cited in the file of this patent

UNITED STATES PATENTS

| | | |
|---|---|---|
| 678,732 | Hall | July 16, 1901 |
| 1,150,415 | Bishop | Aug. 17, 1915 |
| 2,535,036 | Broughton | Dec. 26, 1950 |